(12) United States Patent
Okanoue et al.

(10) Patent No.: US 6,240,089 B1
(45) Date of Patent: May 29, 2001

(54) METHOD OF MULTICASTING FOR MOBILE HOST USED IN ANY ONE OF SUBNETWORKS CONNECTED TO ONE ANOTHER

(75) Inventors: Kazuhiro Okanoue; Tomoki Osawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/028,686

(22) Filed: Feb. 24, 1998

(30) Foreign Application Priority Data

Feb. 24, 1997 (JP) .................................................. 9-039288

(51) Int. Cl.[7] .................................................. H04L 12/46
(52) U.S. Cl. ........................... 370/390; 370/328; 370/401
(58) Field of Search .................................... 370/401, 402, 370/403, 404, 405, 338, 349, 432, 390, 312

(56) References Cited

U.S. PATENT DOCUMENTS

| | | | | |
|---|---|---|---|---|
| 5,572,528 | * | 11/1996 | Shuen .................................... | 370/402 |
| 5,608,726 | * | 3/1997 | Virgile .................................. | 370/401 |
| 5,862,345 | * | 1/1999 | Okanoue et al. ..................... | 709/238 |
| 5,898,686 | * | 4/1999 | Virgile .................................. | 370/381 |
| 5,946,316 | * | 8/1999 | Chen et al. ........................... | 370/408 |
| 5,959,989 | * | 9/1999 | Gleeson et al. ...................... | 370/390 |

FOREIGN PATENT DOCUMENTS

| | | |
|---|---|---|
| 4 157940 | 5/1992 | (JP) . |
| 4-157940 | 5/1992 | (JP) . |
| 6 337824 | 12/1994 | (JP) . |
| 6-337824 | 12/1994 | (JP) . |
| 8 163156 | 6/1996 | (JP) . |
| 8-163156 | 6/1996 | (JP) . |
| 9 214516 | 8/1997 | (JP) . |
| 9-214516 | 8/1997 | (JP) . |
| 9 326791 | 12/1997 | (JP) . |
| 9-326791 | 12/1997 | (JP) . |
| 10 13910 | 1/1998 | (JP) . |
| 10-13910 | 1/1998 | (JP) . |
| 10 135945 | 5/1998 | (JP) . |
| 10-135945 | 5/1998 | (JP) . |

OTHER PUBLICATIONS

IEEE Infocom '96, The Conference on Computer Communications, Proceedings vol. Mar. 1996, Acharya, A. et al., "IP Multicast Extensions for Mobile Internetworking", pp. 67–74.

1997 Electronic Information Communication Society General Meeting, Lecture paper, Communication 2, B–7–147, Kazuhiro Okanoue, et al., "IP Multicast Packet Transfer control considering Mobile Hosts".

Request for Comments; 2002. C. Perkins, "IP Mobility Support", Oct. 1996.

(List continued on next page.)

*Primary Examiner*—Douglas Olms
*Assistant Examiner*—Kenneth Vanderpuye
(74) *Attorney, Agent, or Firm*—Scully, Scott, Murphy & Presser

(57) ABSTRACT

An originator selects at least one sub-network from a plurality of sub-networks to establish a scope of a multicast group and multicasts group characteristic information, which includes a specific group identifier to the scope. The sub-networks include nodes to accept a mobile host. The mobile host is related to one of the nodes to be managed by it. Each node receives the group characteristic information when it is in the scope and judges whether or not to transfer the group characteristic information to the mobile host in response to the content of the group characteristic information. The mobile host judges where the group characteristic information is sent from when it receives the group characteristic information. Then the mobile host judges whether or not the originator admits the mobile host to participate in the multicast group on the basis of the group characteristic information.

19 Claims, 12 Drawing Sheets

OTHER PUBLICATIONS

Proceedings Second International Workshop on Services in Distributed and Networked Environments. Jun. 1995, Chikarame, V. et al., "Mobile IP–based Multicast as a Service for Mobile Hosts", pp. 11–18.

Request for Comments: 1112, S. Deering, "Host Extensions for IP Multicasting", Aug., 1989.

Okanoue, Kazuhiro, et al. IP Mobility with Double P Header, Technical Report of IEICE, The Institute of Electronics, (1995–09).

Perkins C., Standards Track, IP Mobility Support, Oct. 1996, pp. 1–3, 55–66.

Handley & Jacobson, Session Description Protocol, Mar. 24, 1997; pp. 1–33.

Handley, Session Announcement Protocol, Nov. 18, 1996, pp. 1–14.

"IP Multicast Extensions for Mobile Internetworkings" Acharya, et al, 1996.*

Electronic Information and Communication Society Technology Research Report, vol. 97 No. 353, Oct. 31, 1997, SSE97–133, Kazuhiro Okanoue, et al., "Expansion of IP Multicast for Mobile Hosts", pp.43–48.

Request for Comments: 2002. C. Perkins, "IP Mobility Supporyt", Oct. 1996.

Request for Comments: 1112, S. Deering, "Host Extensions for IP Multicasting", Aug. 1989.

Handley & Jacobson, Session Description Protocol, Mar.24, 1997; pp. 1–33.

"IP Multicast Extensions for Mobile Internet Workings" Acharya, et al.

* cited by examiner

MULTICAST ADDRESS

| BIT PATTERN (SCOPE VALUE) | SCOPE | BIT PATTERN (SCOPE VALUE) | SCOPE |
|---|---|---|---|
| 0 0 0 0 | RESERVED | 1 0 0 0 | ORGANIZATION-LOCAL SCOPE |
| 0 0 0 1 | NODE-LOCAL SCOPE | 1 0 0 1 | UNASSIGNED |
| 0 0 1 0 | LINK-LOCAL SCOPE | 1 0 1 0 | UNASSIGNED |
| 0 0 1 1 | UNASSIGNED | 1 0 1 1 | UNASSIGNED |
| 0 1 0 0 | UNASSIGNED | 1 1 0 0 | UNASSIGNED |
| 0 1 0 1 | SITE-LOCAL SCOPE | 1 1 0 1 | UNASSIGNED |
| 0 1 1 0 | UNASSIGNED | 1 1 1 0 | GLOBAL SCOPE |
| 0 1 1 1 | UNASSIGNED | 1 1 1 1 | RESERVED |

PARTICIPATION STATE OF MOBILE HOST

|  | GROUP TYPE 1 | GROUP TYPE 2 | GROUP TYPE 3 | GROUP TYPE 4 |
|---|---|---|---|---|
| CONNECTION STATE 1 | DIRECT METHOD | DIRECT METHOD | DIRECT METHOD | DIRECT METHOD |
| CONNECTION STATE 2 | TRANSFER METHOD | TRANSFER METHOD | NOT PERMIT | NOT PERMIT |
| CONNECTION STATE 3 | NOT PERMIT | NOT PERMIT | NOT PERMIT | NOT PERMIT |
| CONNECTION STATE 4 | NOT PERMIT | DIRECT METHOD | NOT PERMIT | DIRECT METHOD |

FIG. 7

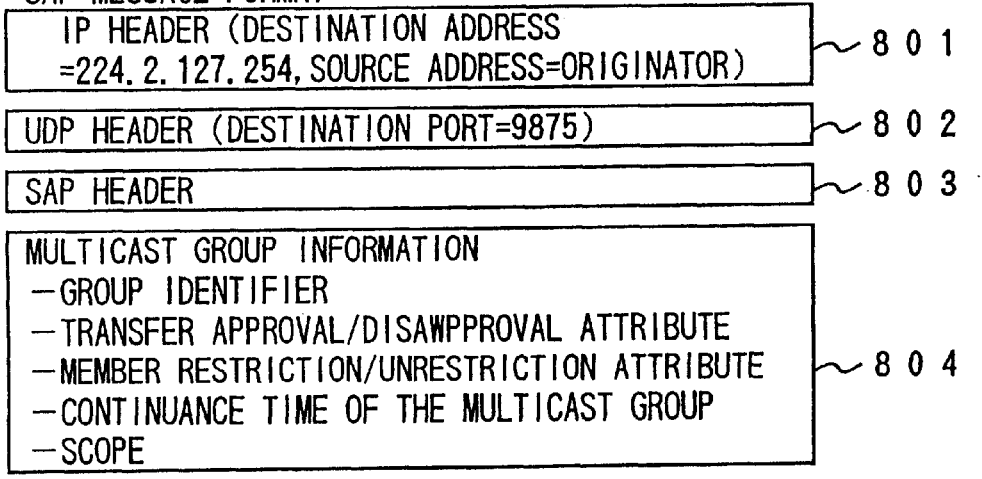

SAP MESSAGE FORMAT

- 801 IP HEADER (DESTINATION ADDRESS =224.2.127.254, SOURCE ADDRESS=ORIGINATOR)
- 802 UDP HEADER (DESTINATION PORT=9875)
- 803 SAP HEADER
- 804 MULTICAST GROUP INFORMATION
  - GROUP IDENTIFIER
  - TRANSFER APPROVAL/DISAWPPROVAL ATTRIBUTE
  - MEMBER RESTRICTION/UNRESTRICTION ATTRIBUTE
  - CONTINUANCE TIME OF THE MULTICAST GROUP
  - SCOPE

FIG. 8

MOBILE HOST MANAGEMENT TABLE        901

|  | LOGIC ADDRESS | LOCATION ADDRESS |
|---|---|---|
| MOBILE HOST 631 | LOGIC ADDRESS "1" | LOCATION ADDRESS "1" |
| MOBILE HOST 632 | LOGIC ADDRESS "2" | LOCATION ADDRESS "2" |

FIG. 9

GROUP CHARACTERISTIC TABLE        1001

| GROUP IDENTIFIER | TRANSFER APPROVAL/ DISAPPROVAL ATTRIBUTE | MEMBER RESTRICTION/ UNRESTRICTION ATTRIBUTE |
|---|---|---|
| GROUP 1 | APPROVAL | RESTRICTION |
| GROUP 2 | DISAPPROVAL | RESTRICTION |
| GROUP 3 | APPROVAL | UNRESTRICTION |
| GROUP 4 | DISAPPROVAL | UNRESTRICTION |

FIG. 10

GROUP CHARACTERISTIC TRANSFER TABLE        1101

| GROUP IDENTIFIER | MOBILE HOST 631 | MOBILE HOST 632 |
|---|---|---|
| GROUP 1 | UNNECESSARY | NECESSARY |
| GROUP 3 | UNNECESSARY | NECESSARY |

FIG. 11

DIRECT PARTICIPATION GROUP TABLE

| GROUP IDENTIFIER |
|---|
| GROUP 1 |
| GROUP 2 |

FIG. 15

NONPARTICIPATION GROUP TABLE

| GROUP IDENTIFIER |
|---|
| GROUP 3 |
| GROUP 4 |

FIG. 16

TRANSFER PARTICIPATION GROUP TABLE

| GROUP IDENTIFIER |
|---|
| GROUP 5 |
| GROUP 6 |

FIG. 17

METHOD OF MULTICASTING FOR MOBILE HOST USED IN ANY ONE OF SUBNETWORKS CONNECTED TO ONE ANOTHER

BACKGROUND OF THE INVENTION

This invention relates to a method of multicasting for a mobile host which is used in a network including a plurality of sub-networks connected to one another.

A network includes a plurality of sub-networks which are connected to one another and serves multicast service that a multicast packet is delivered from an originator to a set of destinations. A scope of the multicast transmission is limited by the originator on the basis of a physical network topology to form a multicast group.

The sub-networks have nodes called agents to accept a mobile host in the network and to assist the mobile host. The mobile host is related to one of the agents, this relationship determines the mobile host's home agent. The mobile host has a specific identifier called a home address which is used by the home agent to manage the mobile host.

In a conventional multicasting method, the mobile host is permitted to participate in the multicast group when the home agent is located in the scope.

However, this method has a defect that the mobile host located in the scope is not permitted to participate in the multicast group when the home agent is located outside scope. Moreover, the method has another defect that the originator can not exclude the mobile host located outside the scope from the multicast group when the home agent is located in the scope.

In another conventional multicasting method, the mobile host is permitted to participate in the multicast group when it is located in the scope.

However, this method has a defect that the mobile host located outside the scope is not permitted to participate in the multicast group though the home agent is located in the scope. Moreover, the method has another defect that the originator can not exclude the mobile host located in the scope from the multicast group even though the home agent is located outside the scope.

SUMMARY OF THE INVENTION

It is therefore an object of this invention to provide a multicasting method capable of forming various multicast groups having different characteristics.

It is another object of this invention to provide a multicasting system which adopts a multicasting method of the type described.

Other objects of this invention will become clear as the description proceeds.

On describing the gist of this invention, it is possible to understand that a method multicasting a multicast packet from an originator to destinations belonging to a multicast group is formed in a network by the originator. The network includes a plurality of sub-networks which are connected to one another and which include hosts and nodes. The sub-networks accept a mobile host by the use of the nodes. One of the nodes is related to the mobile host and is called a home agent. Any one of the hosts becomes the originator to form the multicast group. The destinations are all of the hosts which belong to the multicast group except the originator.

According to a gist of this invention, there is provided a method of multicasting comprising the steps of selecting at least one from the sub-networks to decide a scope of the multicast group at the originator and multicasting a group characteristic information including a specific group identifier from the originator to the scope before multicasting the multicast packet.

The method further comprises the steps of receiving said group characteristic information at said mobile host, and judging at said mobile host whether or not it is admitted said mobile host to participate said multicast group on the basis of said group characteristic information.

In the method, the group characteristic information is directly sent from originator.

The group characteristic information includes a member restriction/unrestriction attribute which shows whether or not the originator demands that the home agent is located in the scope.

The mobile host has a direct participation group table. The method further comprises the step of registering the specific group identifier into the direct participation group table when the member restriction/unrestriction attribute shows that the originator does not demand that the home agent is located in the scope.

The method further comprises the steps of inquiring of the home agent about whether or not the home agent is located in the scope from the mobile host when the mobile host receives the group characteristic information and the member restriction/unrestriction attribute shows that the originator demands that the home agent is located in the scope, and replying from said home agent to said mobile host whether or not said home agent is located in said scope.

The mobile host has a direct participation group table. The method further comprises the step of registering the specific group identifier into the direct participation group table when the home agent replies to the mobile host that the home agent is located in the scope.

The mobile host has a nonparticipation group table. The method further comprises the steps of registering the specific group identifier into the nonparticipation group table when the home agent replies to the mobile host that the home agent is not located in the scope.

In the method, the group characteristic information includes a transfer approval/disapproval attribute which shows whether or not it is approved to transfer the group characteristic information to the mobile host located out of the scope by the originator. The method further comprises the step of transferring the group characteristic information as a transferred group characteristic information to the mobile host when the transfer approval/disapproval attribute shows that it is approved to transfer the group characteristic information to the mobile host located out of the scope.

The home agent has a group characteristic table. The method further comprises the step of registering the specific group identifier into the group characteristic table when the home agent receives the group characteristic information and the group identifier is not registered in the group characteristic table.

The method further comprising the step of inquiring of the mobile host about whether or not the mobile host receives the group characteristic information identified by the specific group identifier when the transfer approval/disapproval attribute shows that it is approved to transfer the group characteristic information to the mobile host located out of the scope before the transferring step.

The home agent having a group characteristic transfer table shows whether or not it is necessary to transfer the group characteristic information to the mobile host, wherein the method further comprising the steps of registering a transfer unnecessary flag into the group characteristic transfer table when the mobile host replies to the home agent that it is unnecessary to transfer the group characteristic information to the mobile host, and registering a transfer necessary flag into the group characteristic transfer table when the mobile host replies to the home agent that it is necessary to transfer the group characteristic information to the mobile host.

The method comprises the step of referring to the group characteristic transfer table to carry out the transferring step.

The method further comprises the steps of changing the transfer necessary flag registered in the group characteristic transfer table into the transfer unnecessary flag when the home agent receives a transfer unnecessary message which shows that it is unnecessary to transfer the group characteristic information to the mobile host from said mobile host.

The method further comprises the steps of receiving the transferred group characteristic information at the mobile host, and judging whether or not the mobile host participate the multicast group on the basis of the transferred group characteristic information.

The mobile host has a transfer participate group table. The method further comprises the steps of judging whether or not the mobile host receives the group characteristic information having the specific group identifier from the originator, and registering the specific group identifier into the transfer participate group table when the mobile host does not receive the group characteristic information from the originator.

The mobile host has a nonparticipation group table. The method further comprises the step of erasing the specific group identifier from the nonparticipation group table when the specific group identifier is registered in the nonparticipation group table and the mobile host does not receive the group characteristic information from the originator.

The mobile host having a direct participation group table. The method further comprises the step of transmitting a transfer unnecessary message to the home agent from the mobile host when the specific group identifier is registered in the direct participation group table.

The method further comprises the step of stopping transferring the group characteristic information having the specific group identifier after the home agent receives the transfer unnecessary message.

BRIEF DESCRIPTION OF THE DRAWING

FIG. 6 is a block diagram of a network that a multicasting method according to a preferred embodiment of this invention is applied to;

FIG. 7 is a table of a participation state of a mobile host;

FIG. 8 shows a SAP message format for multicasting in the network of FIG. 6;

FIG. 9 is a mobile host management table of a home agent 641 of FIG. 6;

FIG. 10 is a group characteristic table of the home agent 641 of FIG. 6;

FIG. 11 is a group characteristic transfer table of the home agent 641 of FIG. 6;

FIG. 15 is a direct participation group table of the mobile host;

FIG. 16 is a nonparticipation group table of the mobile host;

FIG. 17 is a transfer participation group table of the mobile host;

DESCRIPTION OF THE PREFERRED EMBODIMENT

Figures 1, 2:
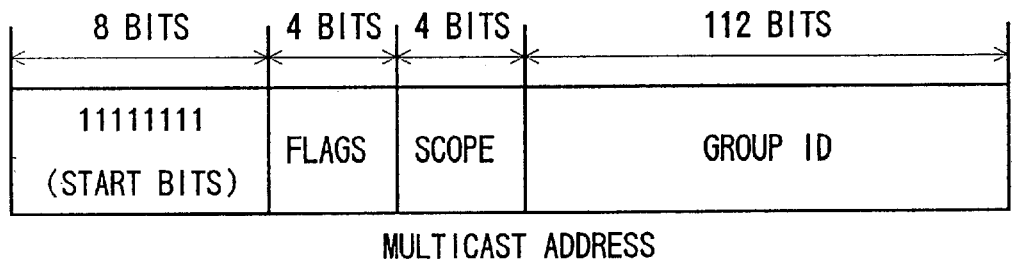
FIG. 1 shows a multicast address of a multicast packet used for multicasting in a conventional network.
FIG. 2 shows an example of scope values included in the multicast address of FIG. 1.

Referring to FIG. 1 and 2, description will be at first directed to a conventional network for a better understanding of this invention.

The conventional network includes a plurality of sub-networks which are connected to one another. Each of sub-networks includes hosts which are connected to one another through each sub-network.

A type of network serves a multicasting service that a multicast packet is delivered from an originator which is one of the hosts to a set of destinations which are a part or all of other hosts. The originator and the destinations form a multicast group. A scope of the multicast transmission is limited by the originator on the basis of the physical network topology to effectively use multicast addresses and to limit the hosts permitted to participate in the multicast group. Generally, the scope is decided by a unit of one or more sub-networks. The terminology of "scope" is used in a dissertation which was submitted by Stephen Edward Deering to Stanford University in 1991 and which is entitled "MULTICAST ROUTING IN A DATAGRAM INTERNETWORK".

The scope is provided by a scope field which is inserted in a multicast address of the multicast packet. The multicast address is disclosed in a document which was written by R. Hinden and S. Deering in December 1995 and which is entitled "IP Version 6 Addressing Architecture". As shown in FIG. 1, the multicast address has a start bit sequence, flags, a scope value, and a group identifier. For example, the scope values are provided as shown in FIG. 2.

Figure 3:
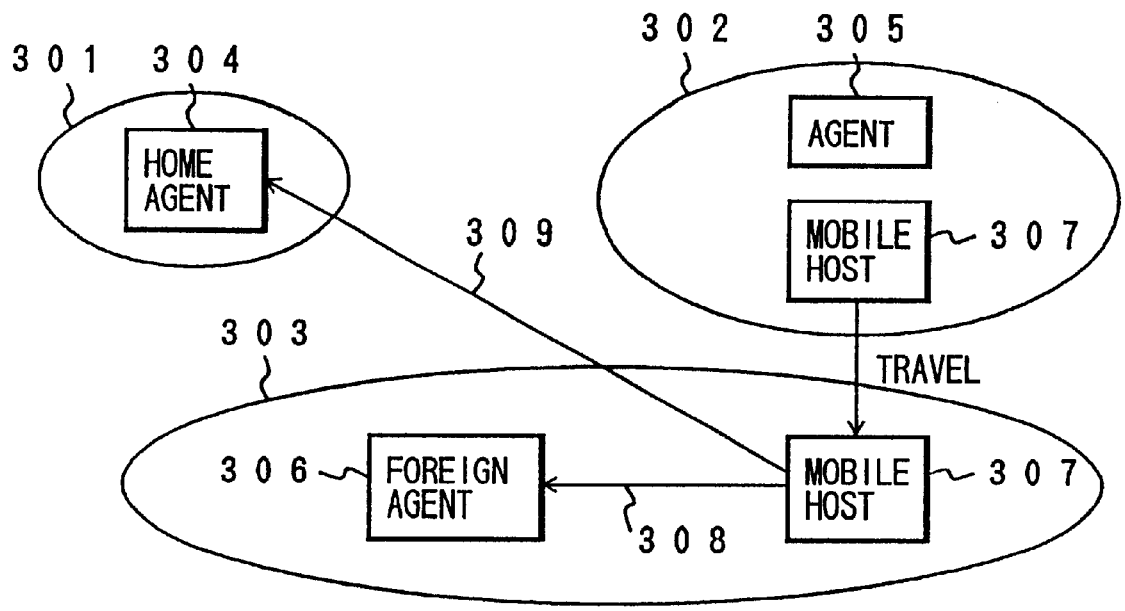
FIG. 3 shows another conventional network which accepts a mobile host.

Referring to FIG. 3, another type of the network will be described soon.

The sub-networks 301, 302 and 303 have nodes 304, 305 and 306, respectively, to support or assist a mobile host 307. The nodes 304, 305 and 306 are called agents. The mobile host 307 is related to the node 304 located in the sub-network 301. The sub-network 301 is called a home network and the node 304 is called a home agent for the mobile host 307. The mobile host 307 has a specific identifier or a home address assigned by the network. The home agent 304 manages the mobile host 307 by the use of the specific identifier.

The mobile host 307 can freely travel among sub-networks 301, 302, and 303. If the mobile host 307 travels from the sub-network 302 to the sub-network 303, the node 306 is called a foreign agent for the mobile host 307. The mobile host 307 sends location information 308 and 309 which are representative of the present location of the mobile host 307 to the foreign agent 306 and the home agent 304, respectively. The foreign agent 306 and the home agent 304 memorize the location information 308 and 309, respectively, to support the mobile host 307.

Such a network is disclosed in a dissertation which was contributed by Okanoue, Osawa, Goto and Komatu to "IN 95-64, Vol. 95, No. 269, Electric Information Communication Society" and which is entitled "A proposal of IP system which copes with a mobile terminal doubling IP header".

Lately, it is desired to serve the multicast service in the network which supports the mobile host. However, the multicast service can not cover the mobile host in the network because the mobile host's sphere of activity can not be previously limited within the scope.

Two multicasting methods for the mobile host are disclosed in a document which was written by C. Perkins in October 1996 and which is entitled "IP Mobility Support". One is called a transfer participation method and the other is called a direct participation method.

Figure 4:
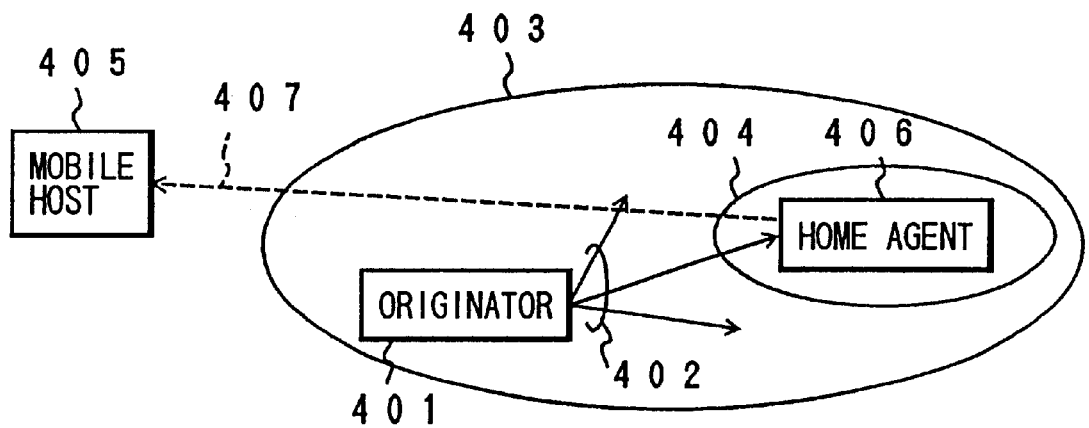
FIG. 4 is a diagram for explaining a transfer participation method in the conventional network of FIG. 3.

Referring to FIG. 4, the transfer participation method will be described bellow.

When an originator 401 forms a multicast group, it transmits a multicast packet 402 which decides a scope 403 into the network. If a home network 404 of a mobile host 405 is included in the scope 403, a home agent 406 of the mobile host 405 receives the multicast packet 402. The home agent 406 and the mobile host 405 are connected by a logic channel called a bidirectional tunnel 407. The home agent 406 encapsulates the multicast packet 402 into a uni-cast packet and sends it to the mobile host 405 through the bidirectional tunnel 407. Therefore, the mobile host 405 can participate in the multicast group regardless of the present location of itself when the home agent 406 is included in the scope 403.

In a case that the mobile host 405 acts the originator, the mobile host 405 encapsulates another multicast packet into an encapsulated multicast packet and transmit it to the home agent 406 through the bidirectional tunnel 407. The home agent 406 uncapsulate the encapsulated multicast packet and transmit it into the network. Therefore, the mobile host 405 can participate in the multicast group as the originator.

Figure 5:
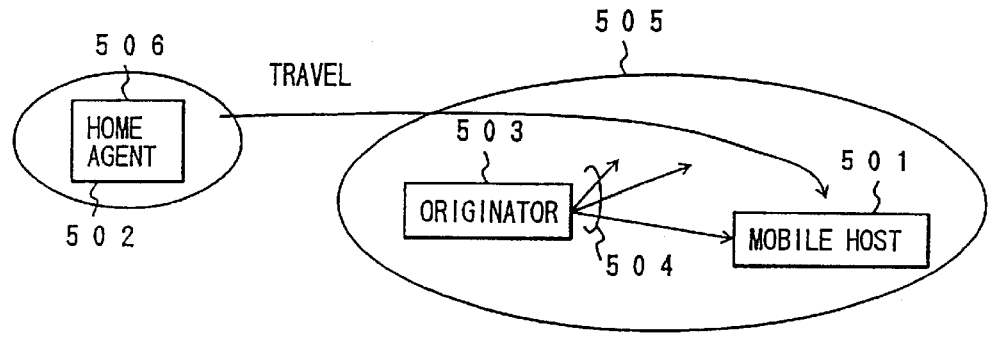
FIG. 5 is a diagram for explaining a direct participation method in the conventional network of FIG. 3.

Referring to FIG. 5, the direct participation method will be described.

It is assumed that a mobile host 501 travels from a home network 502 to a foreign network. An originator 503 transmits a multicast packet 504 which provides a scope 505 including the foreign network into the network to form a multicast group. In this situation, the mobile host 501 receives the multicast packet 502. Namely, the mobile host 501 can participate in the multicast group irrespective of the home network 502 and the home agent 506. Similarly, the mobile host 501 can act the originator at the foreign network irrespective of the home network 502 and the home agent 506.

By the way, it is desired that two types of the multicast group are realized in the network supporting the mobile host.

A first group includes all of the mobile hosts which belong to a particular management organization managing at least one of the sub-networks. In other words, the mobile hosts belonging the particular management organization can participate in the first group even though they are located in sub-networks which are not managed by the particular management organization.

A second group includes all of the mobile hosts which are connected to (or located at) a particular sub-network. In other words, the mobile hosts connecting to the particular sub-network can participate with the second group regardless of management organizations which manages them.

However, the transfer participation method can not realize the second group in some cases. In addition, the direct participation method can not realize the first group in other cases.

Namely, with the transfer participation method, the mobile host located in the scope can not receive the multicast packet unless its home agent is located outside the scope. Moreover, with the transfer participation method, the multicast packet is transmitted to the mobile host located in the scope if its home agent is located in the scope. Therefore, the transfer participation method can not realize the second group in these cases.

On the other hand, with the direct participation method, the mobile host located outside the scope can not receive the multicast packet even though its home agent is located in the scope. Moreover, with the direct participation method, the mobile host located in the scope can not be excluded from the multicast group on the basis of its management organization. Therefore, the direct participation method can not realize the second group in these cases.

Referring to FIGS. 6 through 27, the description will proceed to a multicasting method according to a preferred embodiment of this invention.

Figure 6:
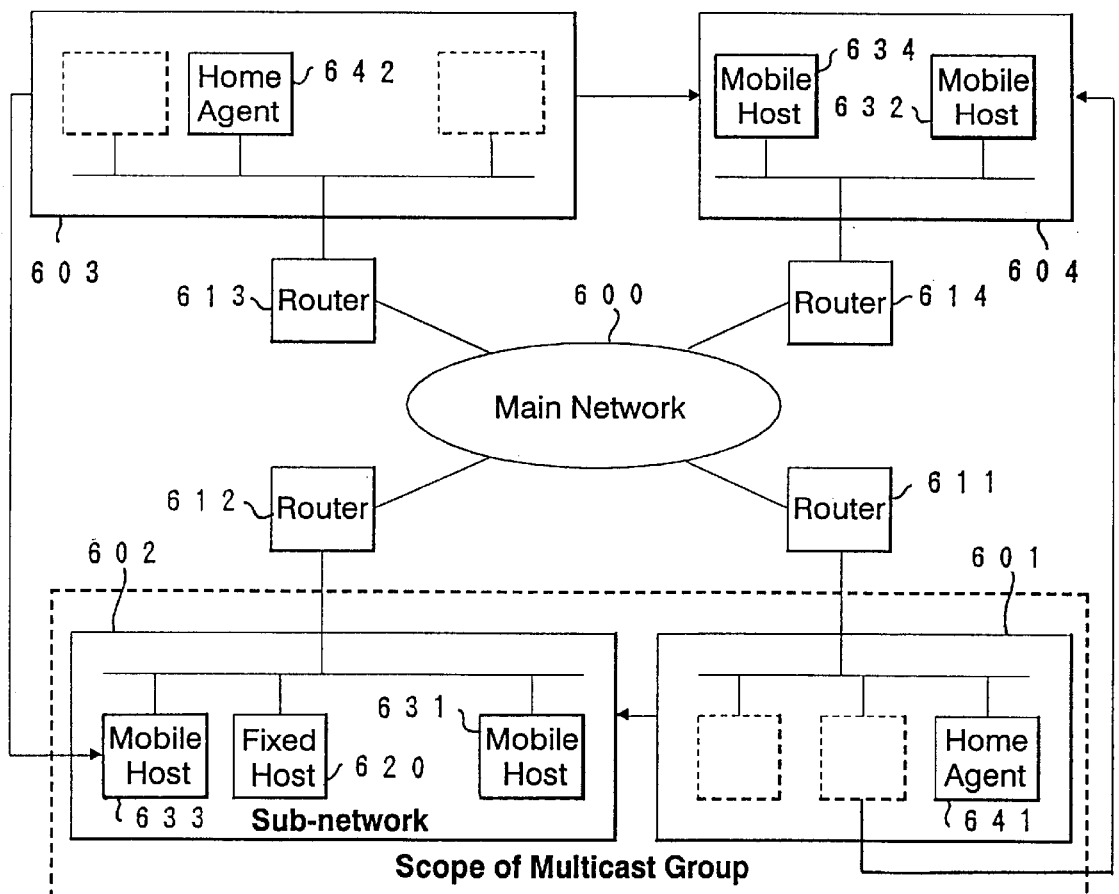

The multicasting method is applied to a network illustrated in FIG. 6. In FIG. 6, the network has a main network 600 and sub-networks 601, 602, 603 and 604 which are connected to the main network 600 by routers 611, 612, 613 and 614, respectively. Each of the sub-networks 601, 602, 603 and 604 includes a plurality of fixed hosts (only one shown and designated by 620). The sub-networks 601, 602, 603 and 604 are managed by different management organizations.

The network includes mobile hosts 631, 632, 633 and 634. The mobile hosts 631 and 632 are managed by a home agent 641 which belongs to the sub-network 601. The mobile hosts 633 and 634 are managed by a home agent 642 which belongs to the sub-network 603. The mobile hosts 631 and 633 are located in the sub-network 602 and are connected to the sub-network 602 by radio or lines. The mobile hosts 632 and 634 are located in the sub-network 604 and are connected to the sub-network 604 by radio or lines.

Each of the mobile hosts 631, 632, 633 and 634 has an specific identifier (or a logical address) which identify each mobile host regardless of its location and has location address which is representative of the present location. A combination of the specific identifier and the location address is notified to each of the home agents.

Herein, it is assumed that the fixed host 620 becomes an originator. The fixed host 620 establishes a scope 650 to form a multicast group which includes hosts belonging to the management organizations, which manage the sub-networks 601 and 602.

In this situation, each of the mobile hosts can be in one of four connection states as mentioned below.

A first connection state is that both of its home network (or its management organization) and its present location are included in the scope 650. The mobile host 631 is classified into the first connection state.

A second connection state is that its home network is included in the scope 650 and that its present location is not included in the scope 650. The mobile host 632 is classified into the second connection state.

A third connection state is that neither of its home network nor its present location is included in the scope 650. The mobile host 634 is classified into the third connection state.

A fourth connection state is that its home network is not included in the scope 650 and that its present location is included in the scope 650. The mobile host 633 is classified into the third connection state.

On the other hand, the multicast group formed by the originator is classified into one of four types as follows.

A first type permits the home agent located in the scope to transfer the multicast packet to the mobile host which is managed by the home agent and which is located outside the scope. In addition, the first type does not permit the mobile host which is located in the scope and which has the home agent located outside the scope to participate in the multicast group.

A second type permits the home agent located in the scope to transfer the multicast packet to the mobile host which is managed by the home agent and which is located outside the scope. In addition, the second type permits the mobile host which is located in the scope to participate in the multicast group in spite of its home agent.

A third type does not permit the home agent located in the scope to transfer the multicast packet to the mobile host which is managed by the home agent and which is located outside the scope. In addition, the third type does not permit the mobile host which is located in the scope and which has the home agent located outside the scope to participate in the multicast group.

A fourth type does not permit the home agent located in the scope to transfer the multicast packet to the mobile host which is managed by the home agent and which is located outside the scope. In addition, the fourth type permits the mobile host which is located in the scope to participate in the multicast group in spite of its home agent.

On the basis of these classifications, each of the mobile hosts is permitted to participate in the multicast group with a participation state illustrated in FIG. 7.

Namely, when the mobile host is classified into the first connection state, the mobile host is permitted to participate in the multicast group by the direct participation method. This is because both of the mobile host and its home agent are located in the scope.

When the mobile host is classified into the second connection state and the multicast group is classified into the first type or the second type, the mobile host is permitted to participate in the multicast group by the transfer participation method. This is because the mobile host is located outside the scope but its home agent is located in the scope.

When the mobile host is classified into the second connection state and the multicast group is classified into the third type or the fourth type, the mobile host is not permitted to participate in the multicast group. This is because the mobile host is located outside the scope and it is not permitted that the multicast packet is transferred to the outside of the scope.

When the mobile host is classified into the third connection state, the mobile host is not permitted to participate in the multicast group. This is because both the mobile host and its home agent are located outside the scope and can not know existence of the multicast group.

When the mobile host is classified into the fourth connection state and the multicast group is classified into the first type or the third type, the mobile host is not permitted to participate in the multicast group. This is because even though the mobile host is located in the scope, its home agent is located outside the scope.

When the mobile host is classified into the fourth connection state and the multicast group is classified into the second type or the fourth type, the mobile host is permitted to participate in the multicast group by the direct participation method. This is because the mobile host is located in the scope and it is not required that its home agent is located in the scope.

The multicasting method achieves the participation states shown in FIG. 7 as follows.

At first, the originator decides the scope so as to include all sub-networks which manage hosts permitted to participate in the multicast group. The scope is achieved by the use of the scope values as shown in FIG. 2.

The originator further decides whether or not it is permitted or approved that the home agent located in the scope transfers the multicast packet to the mobile host located outside the scope. This decision is represented by a transfer approval/disapproval attribute.

The originator still further decides whether or not it is necessary that the home agent is located in the scope when the mobile host located in the scope participates the multicast group. The decision is represented by a member restriction/unrestriction attribute.

The transfer approval/disapproval attribute and the member restriction/unrestriction attribute limit the transfer destination and the participate member, respectively, in response to a characteristic of the multicast group.

The originator transmits a message which includes a multicast group information into the network to form a multicast group. The multicast group information includes the transfer approval/disapproval attribute, the member restriction/unrestriction attribute, the scope and a group identifier etc.

For example, the message is transmitted in accordance with a session announcement protocol (SAP) which is disclosed in a document titled "SAP Session Announcement Protocol" by Mark Handley. The multicast group information is disclosed in a document which was written by Mark Handley and which is entitled "SDP Session Description Protocol".

A format of the message is shown in FIG. 8. In FIG. 8, the format is an SAP message format and has an IP header 801, a UDP header 802, an SAP header 803, and a multicast group information section 804. The multicast group information section 804 includes, at least, the group identifier, the transfer approval/disapproval attribute, the member restriction/unrestriction attribute, a continuance time of the multicast group.

Referring to FIG. 9 together with FIG. 6, each home agent memorizes combinations of the logical address and the location address of the mobile hosts managed by it in a mobile host management table as shown in FIG. 9. For example, the home agent 641 has the mobile host management table to manage the mobile hosts 631 and 632. In FIG. 9, the mobile host management table 901 shows that the mobile host 631 has the logical address "1" and the location address "1" while the mobile host 632 has the logical address "2" and the location address "2".

In addition, each home agent has a group characteristic table as shown in FIG. 10 to hold group characteristics each of which includes at least the group identifier, the transfer approval/disapproval attribute, and the member restriction/unrestriction attribute. In FIG. 10, four group characteristics are registered in the group characteristic table 1001. This shows that the home agent receives four messages to form four multicast group discriminated by the group identifier "1" through "4".

Moreover, each home agent has a group characteristic transfer table as shown in FIG. 11 to decide whether or not it should transfer the message sent from the originator to the mobile hosts managed by it. For example, the home agent 641 has the group characteristic transfer table 1101 shown in FIG. 11. The group characteristic transfer table 1101 is formed on the basis of the mobile host management table 901 and the group characteristic table 1001 and shows that it is unnecessary to transfer the multicast packets identified by the group identifier "1" and "3" to the mobile host 631 and it is necessary to transfer the multicast packets identified by the group identifier "1" and "3" to the mobile host 632.

Figure 12:
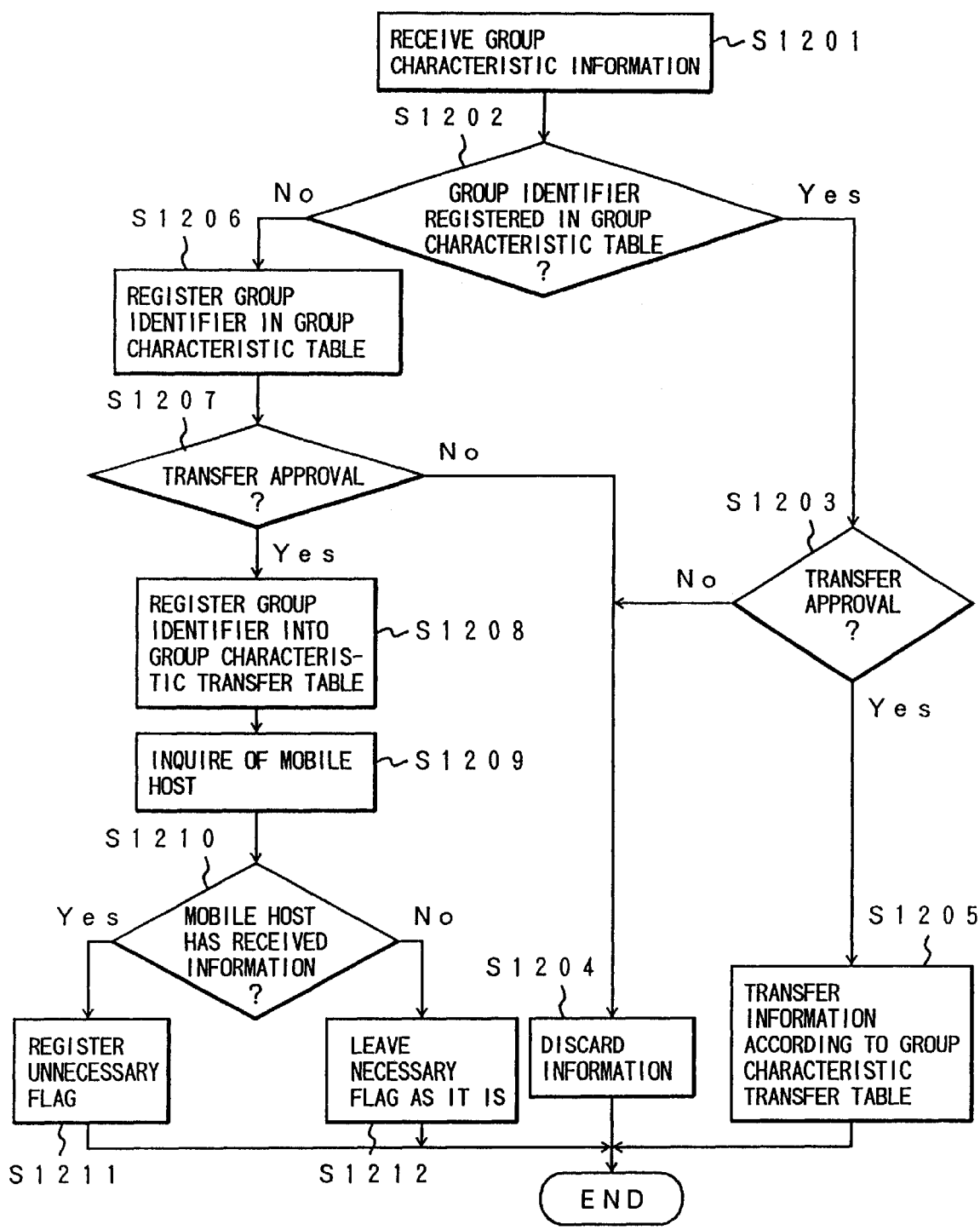
FIG. 12 is a flow chart for describing an operation of the home agent.

Referring to FIG. 12, an operation of the home agent for receiving the SAP message will be described soon.

The home agent receives the SAP message (i.e. the group characteristic information) at a step S1201 and judges whether or not the group identifier included in the received SAP message is registered in the group characteristic table at a step S1202.

If the group identifier of the received SAP message is registered in the group characteristic table, the step S1202 goes to a step S1203. Then, the home agent refers to the transfer approval/disapproval attribute related to the group identifier to judge whether or not the transfer of the received SAP message is permitted by the originator at the step S1203.

When the transfer of the received SAP message is not permitted, the home agent discards the received SAP message at a step S1204. On the other hand, the home agent transfers the SAP message to the mobile host(s) according to the group characteristic transfer table at a step S1205 when the transfer of the received SAP message is permitted. In this case, the home agent uses a packet format as illustrated in FIG. 13 to transfer the received SAP message to the mobile host(s).

Figure 13:
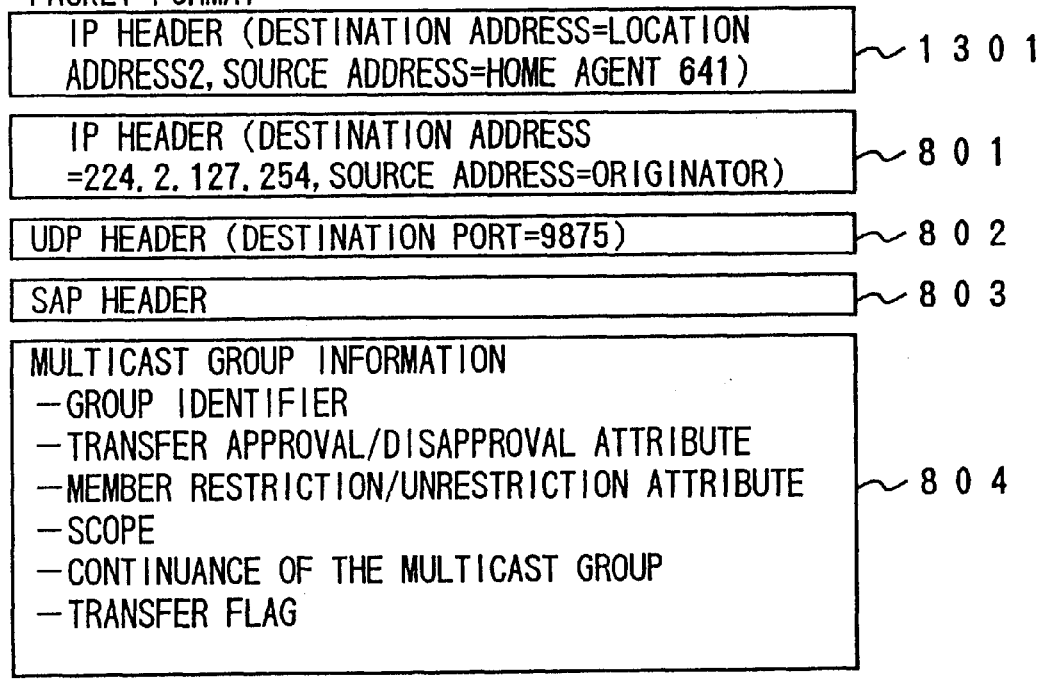
FIG. 13 shows a transfer message format transferred from the home agent 641 to the mobile host 631 of FIG. 6.

The packet format shown in FIG. 13 is an example in a case that the home agent 641 transfer the received SAP message to the mobile host 632. Namely, the home agent 641 adds an IP header 1301 to the received SAP message (refer to FIG. 8) to encapsulate the SAP message. The IP header 1301 includes the location address (i.e. the location address "2") as a destination address and the peculiar address of the home agent 641 as source address. In addition, the home agent 641 adds a transfer flag to the multicast group information section 804 to show that the encapsulated message is sent from the home agent 641.

Referring to FIG. 12, when the home agent judges that the group characteristic information is not registered in the group characteristic table at the step S1202, the home agent registers the group identifier, the transfer approval/disapproval attribute, and the member restriction/unrestriction attribute included in the received SAP message into the group characteristic table at a step S1206. Then, the home agent judges whether or not the transfer of the SAP message is permitted on the basis of the transfer approval disapproval attribute at a step S1207 like the step S1203.

If the transfer of the SAP message is not permitted, the step S1207 goes to the step S1204. Then, the home agent discards the received SAP message.

When the transfer of the received SAP message is permitted, the home agent registers the group identifier into the group characteristic transfer table at a step S1208. In this time, the home agent registers a "necessary" flag for each mobile host in the group characteristic transfer table. The "necessary" flag shows that it is necessary to transfer the received SAP message to each mobile host.

Next, the home agent sends an inquiry message to inquire about whether or not each mobile host receives the SAP message of each mobile host managed by the home agent at a step S1209. To be exact, the home agent inquires about whether or not the group identifier of the received SAP message is registered in a direct participation group table which is mentioned after. Namely, the inquiry message includes the group identifier of the received SAP message.

When each mobile host receives the inquiry message, it sends a response message to the home agent. If the mobile host has received the SAP message including the group identifier which is equal to the group identifier included in the inquiry message, it sends the response message which includes the logical address of it, the group identifier, and a reception flag to the home agent. When the mobile host has not received the SAP message including the group identifier which is equal to the group identifier included in the inquiry message, it sends the response message which includes the logical address of it, the group identifier, and a non-reception flag.

The home agent receives the response message(s) at a step S1210. Then, the home agent judges whether or not each mobile host is received the SAP message in response to the response message(s).

If the response message includes the reception flag, the home agent renews the group characteristic transfer table about the mobile host which sends the response message at a step S1211. Namely, the home agent changes the "necessary" flag into an "unnecessary" flag about the mobile host.

If the response message includes the non-reception flag, the home agent leaves the group characteristic transfer table as it is about the mobile host which sends the response message at a step S1212. Namely, the home agent leaves the "necessary" flag as it is about the mobile host. The home agent encapsulates the received SAP message and transfers it to the mobile host.

Figure 14:
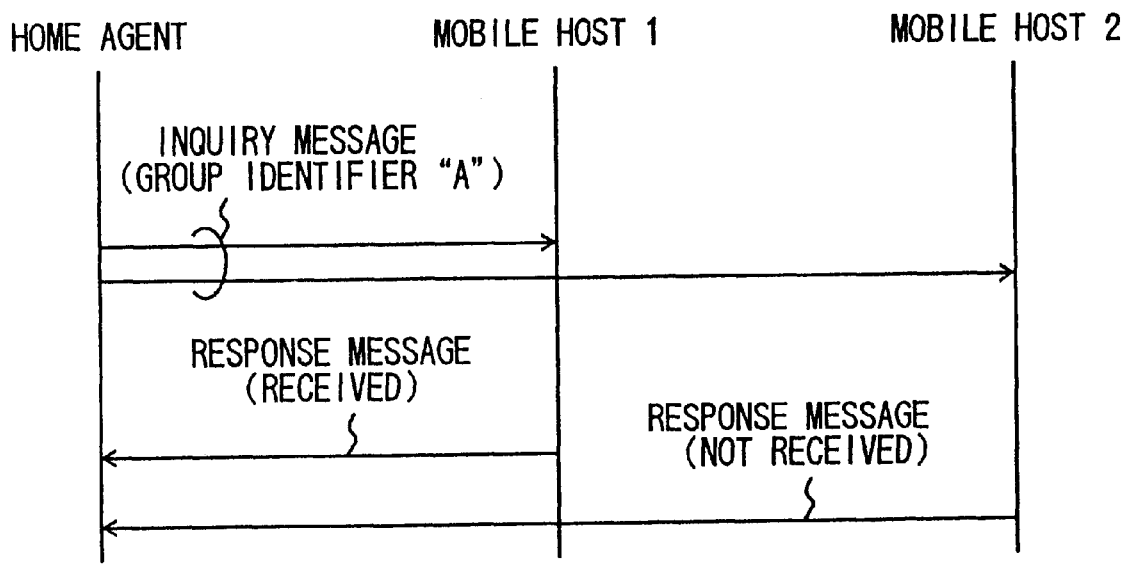
FIG. 14 shows exchanging messages between the home agent and the mobile hosts at a step S1209 and a step S1210 of FIG. 12.

In FIG. 14, the messages used at the step S1209 and the step S1210 are exchanged between the home agent and the mobile hosts "1" and "2". In this case, the home agent manages the mobile hosts "1" and "2" and sends the inquiry message including the group identifier "A". Moreover, the mobile host "1" has received the group characteristic information having the group identifier "A" (i.e. the group identifier "A" is registered in the direct participation group table) while the mobile host "2" has not received the group characteristic information having the group identifier "A" (i.e. the group identifier "A" is not registered in the direct participation group table). The mobile host "1" sends the response message which indicates reception of the group characteristic information to the home agent. The response message includes the group identifier "A", the logical address of the mobile host "1", and the reception flag. On the other hand, the mobile host "2" sends the response message which indicates nonreception of the group characteristic information to the home agent. The response message includes the group identifier "A", the logical address of the mobile host "2", and the nonreception flag.

Continuously, an operation of the mobile host in a case that the mobile host receives the SAP message will be described bellow.

The mobile host has the direct participation group table as shown in FIG. 15, a nonparticipation group table as shown in FIG. 16, and a transfer participation group table as shown in FIG. 17. Herein, the direct participation group table has the group identifiers of groups "1" and "2". Moreover, the nonparticipation group table has the group identifiers of groups "3" and "4". In addition, the transfer participation group table has the group identifiers of groups "5" and "6". Accordingly, the mobile host can participate in the groups "1" and "2" by the direct participation method and can participate in the groups "5" and "6" by the transfer participation method. However, the mobile host can not precipitate the groups "3" and "4".

Figure 18:
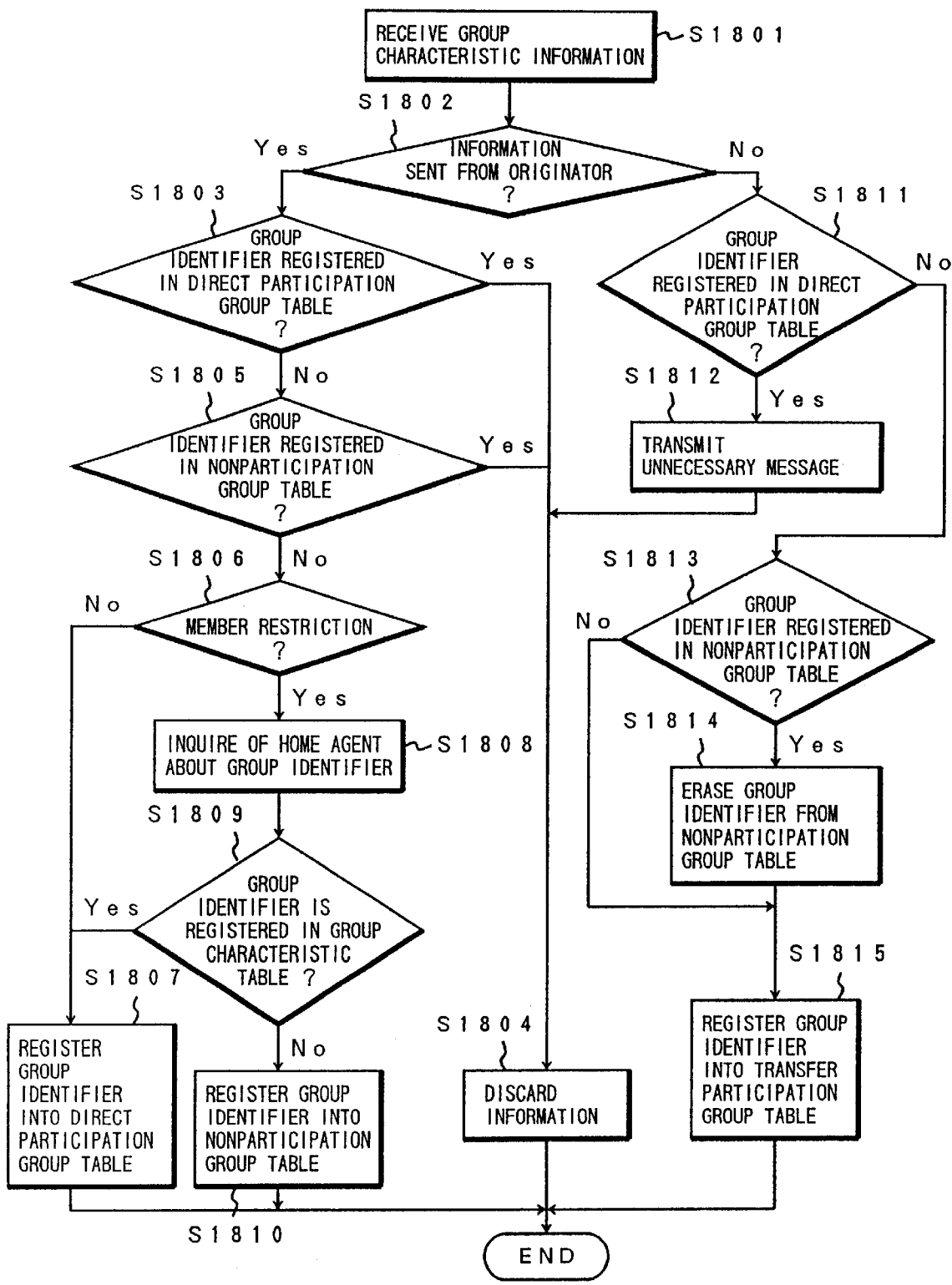
FIG. 18 is a flow chart for describing an operation of the mobile host.

There are two cases that the mobile host receives the SAP message. One is that the mobile host directly receives the SAP message as shown in FIG. 8 from the originator and the other is that the mobile host received the SAP message as shown in FIG. 13 from the home agent. Accordingly, the mobile host operates as illustrated in FIG. 18 when it receives the SAP message.

Namely, the mobile host receives the SAP message at a step S1801 and judges where is the SAP message sent from at a step S1802. This judgement is carried out by detecting of the transfer flag from the multicast group information section of the received SAP message.

If the SAP message is sent from the originator, the step S1802 goes to a step S1803. At the step S1803, the mobile host judges whether or not the group identifier included in the received SAP message is registered in the direct participation group table. When the group identifier is registered in the direct participation group table, the mobile host discards the received SAP message at a step S1804.

When the group identifier is not registered in the direct participation group table, the mobile host judges whether or not the group identifier is registered in the nonparticipation group at a step S1805. If the group identifier is registered in the nonparticipation group table, the mobile host discards the SAP message at the step S1804.

If the mobile host judges that the group identifier is not registered in the nonparticipation group table at the step S1805, the mobile host refers to the member restriction/unrestriction attribute of the received SAP message at a step S1806. When the member restriction/unrestriction attribute represents nothing of the member limitation, the mobile host registers the group identifier in the direct participation group table at a step S1807.

When the member restriction/unrestriction attribute represents existing of the member limitation, the mobile host inquires of its home agent whether or not the home agent has received the SAP message including the same group identifier at a step S1808. In other words, the mobile host transmits a mobile host group identifier inquiry message to the home agent to inquire whether or not the group identifier is registered in the group characteristic table of the home agent as mentioned after. The mobile host group identifier inquiry message includes the group identifier and the logical address of the mobile host.

The home agent transmits a reply message which shows either reception of the SAP message or non-reception, if it receives the mobile host group identifier inquiry message. The reply message shows the reception and includes the group identifier and a reception flag when the group identifier is registered in the group characteristic table of the home agent while the reply message shows the non-reception and includes the group identifier and a non-reception flag when the group identifier is not registered in the group characteristic table.

The mobile host receives the reply message and judges which does the reply message show the reception or the non-reception at a step S1809. When the reply message shows the reception, the mobile host registers the group identifier into the direct participation group table at the step S1807. When the reply message shows the non-reception, the mobile host registers the group identifier into the non-participation group at a step S1810.

Figure 19:
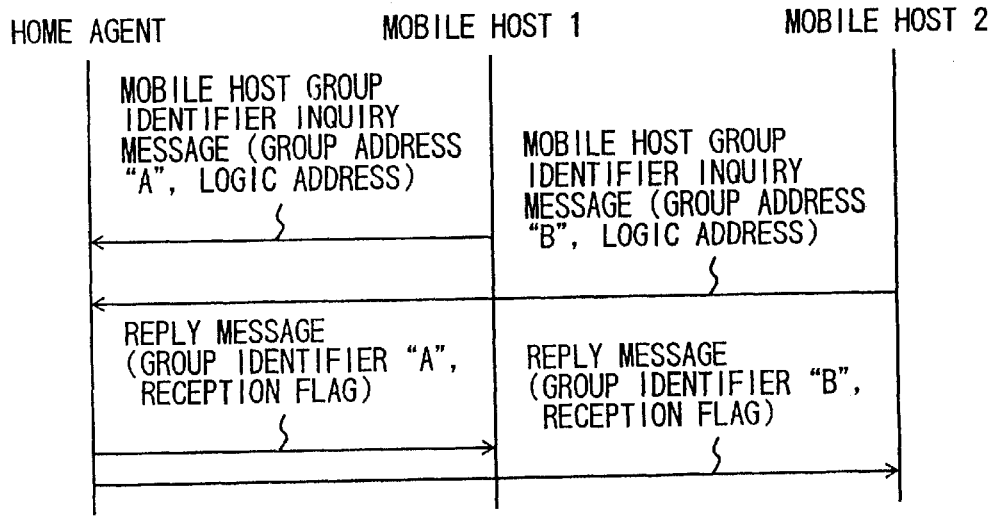
FIG. 19 shows exchanging messages between the home agent and the mobile hosts at a step S1808 and a step S1809 of FIG. 18.

In FIG. 19, the messages used at the steps S1808 and the step S1809 are exchanged between the home agent and the mobile hosts "1" and "2". In this case, the mobile host "1" sends the mobile host group identifier inquiry message which includes the group identifier "A" and the logical address of the mobile host "1" to the home agent. The mobile hosts "2" sends the mobile host group identifier inquiry message which includes the group identifier "B" and the logical address of the mobile host "2" to the home agent. It is assumed that the home agent has received the SAP message including the group identifier "A" and has not received the SAP message including the group identifier "B". When the home agent receives the mobile host group identifier inquiry message sent from the mobile host "1", it transmits the reply message to show the reception. When the home agent receives the mobile host group identifier inquiry message sent from the mobile host "2", it transmits the reply message to show the non-reception.

Returning to FIG. 18, the step S1802 goes to a step S1811 when the SAP message is sent from the home agent. Then, the mobile host judges whether or not the group identifier is registered in the direct participation group table.

When the group identifier is registered in the direct participation group table, the mobile host transmits an unnecessary message to the home agent at a step S1812. The unnecessary message includes the group identifier, the logical address of the mobile host, and an unnecessary flag which represents that it is unnecessary to transfer the SAP message to the mobile host.

Figure 20:
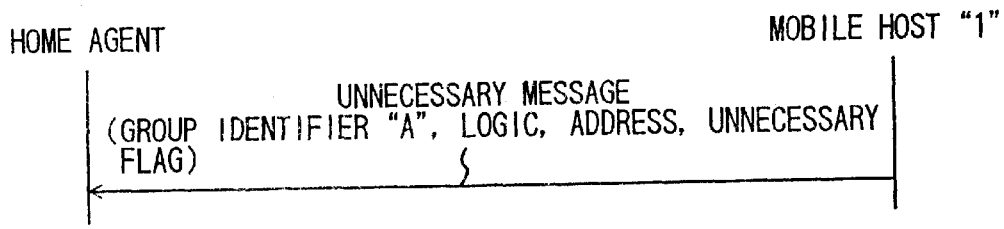
FIG. 20 shows exchanging messages between the home agent and the mobile host at a step S1812 of FIG. 18.

In FIG. 20, the unnecessary message is used between the home agent and the mobile host "1". The mobile host "1" sends the unnecessary message to inform that it is unnecessary to transfer the SAP message including the group identifier "A". The unnecessary message includes the group identifier "A", the logical address of the mobile host "1", and "unnecessary" flag.

Returning to FIG. 18 again, when the group identifier is not registered in the direct participation group table at the step S1811, the step S1811 goes to a step S1813. At the step S1813, the mobile host judges whether or not the group identifier is not registered in the nonparticipation group table.

When the group identifier is registered in the nonparticipation group, the mobile host erases the group identifier from the nonparticipation group table at a step S1814 and registers the group identifier into the transfer participation group table at a step S1815. If the group identifier is not registered in the nonparticipation group, the step S1813 jump to the step S1814. Namely, the mobile host immediately registers the group identifier into the transfer participation group table.

It is easily understood from the above explanation that the home agent receives the reception message, the non-reception message, the unnecessary message which are sent from each of the mobile host. The home agent renews the group characteristic transfer table (see FIG. 11) as described below.

Figure 21:
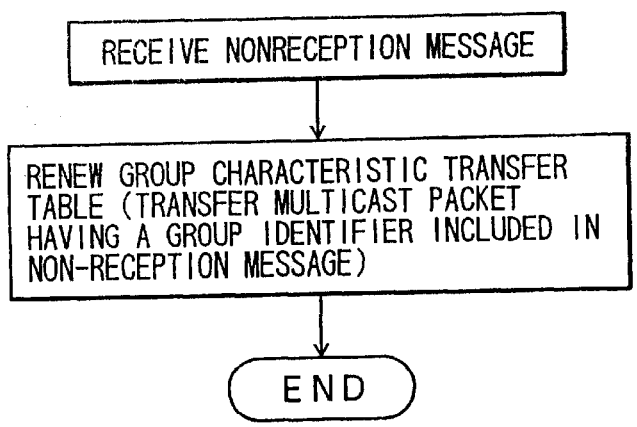
FIG. 21 is a flow chart for describing the operation of the home agent when it receives a non-reception message sent from the mobile host.

When the home agent receives the non-reception message, it renews the group transfer table so that the home agent transfers the SAP message which has the same group identifier as the non-reception message to the mobile host as illustrated in FIG. 21.

Figure 22:
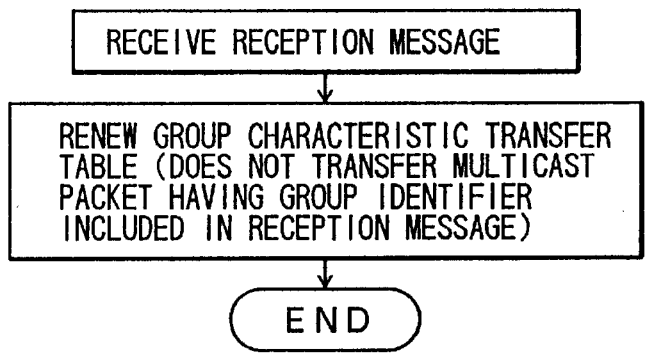
FIG. 22 is a flow chart for describing the operation of the home agent when it receives a reception message sent from the mobile host.

When the home agent receives the reception message, it renews the group transfer table so that the home agent does not transfer the SAP message which has the same group identifier as the reception message to the mobile host as illustrated in FIG. 22.

Figure 23:
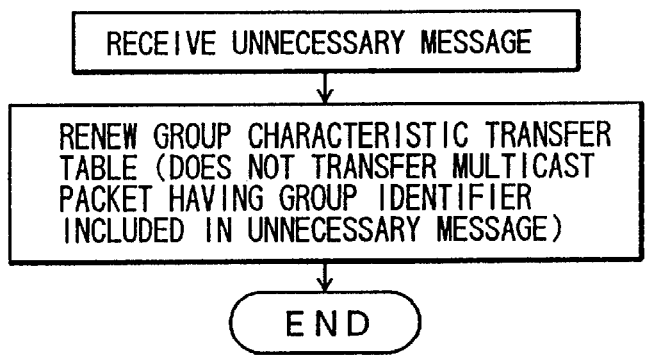
FIG. 23 is a flow chart for describing the operation of the home agent when it receives an unnecessary message sent from the mobile host.

When the home agent receives the unnecessary message, it renews the group transfer table so that the home agent does not transfer the SAP message which has the same group identifier as the reception message to the mobile host as illustrated in FIG. 23.

Figure 24:
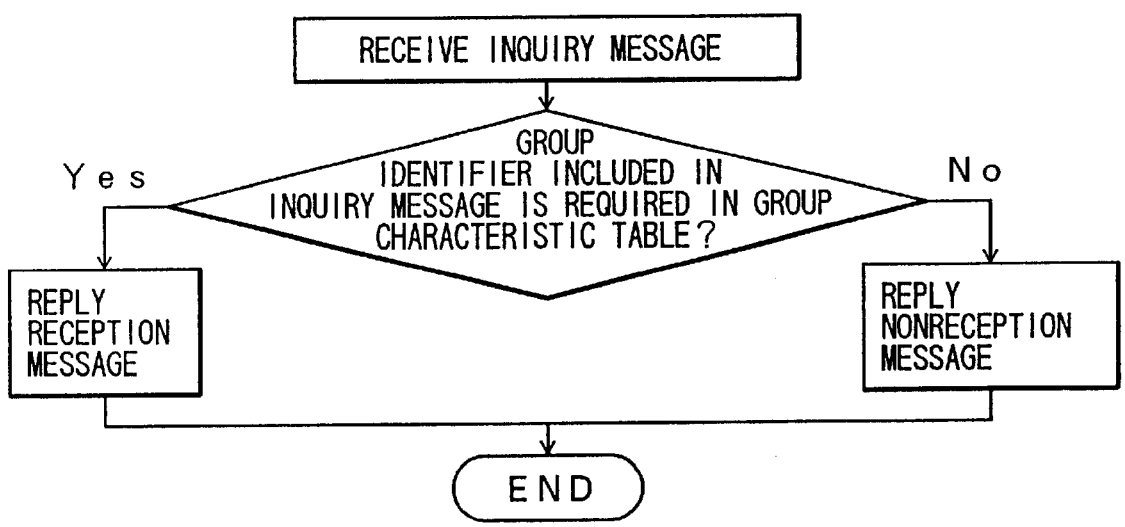
FIG. 24 is a flow chart for describing the operation of the home agent when it receives a mobile host group identifier inquiry message sent from the mobile host.

In addition, the home agent receives the mobile host group identifier inquiry message as mentioned above. In this case, the home agent operates as shown in FIG. 24.

Namely, the home agent judges whether or not the group identifier included in the inquiry message is registered in the group characteristic table (see FIG. 10). If the group identifier is registered in the group characteristic table, the home agent replies the reception message to the mobile host. If the group identifier is not registered in the group characteristic table, the home agent replies the non-reception message to the mobile host.

On the other hand, the mobile host receives the home agent group identifier inquiry message, the reception reply message, and the non-reception reply message except the SAP message.

Figure 25:
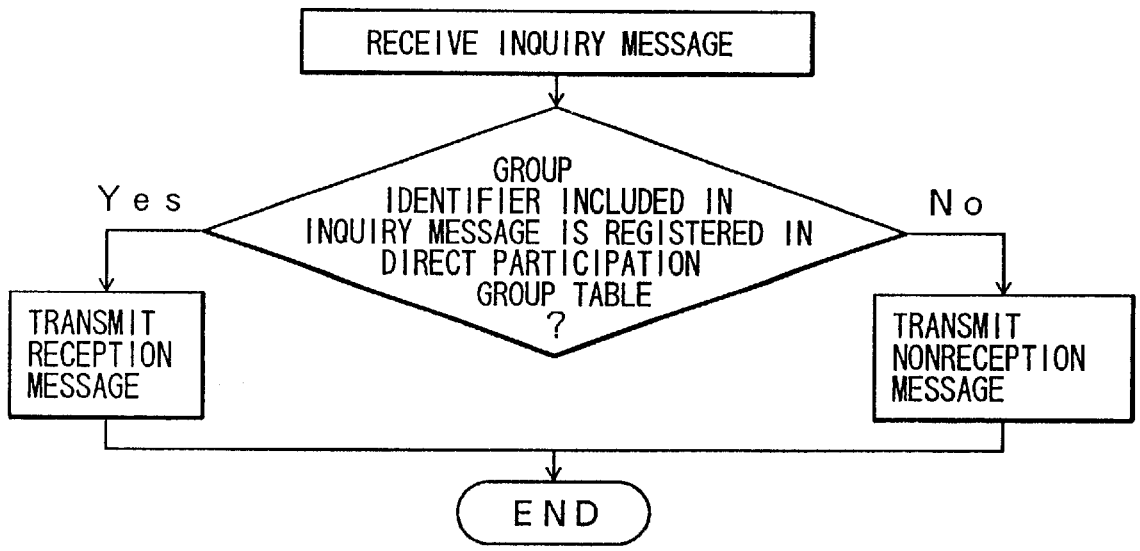
FIG. 25 is a flow chart for describing the operation of the mobile host when it receives a home agent group identifier inquiry message sent from the home agent.

When the mobile host receives the home agent group identifier inquiry message, it judges whether or not the group identifier included in the inquiry message is registered in the direct participation group table as illustrated in FIG. 25. If the group identifier is registered in the direct participation group table, the mobile host transmits the mobile host reception message to the home agent. On the other hand, the mobile host transmits the mobile host non-reception message to the home agent, when the group identifier is not registered in the direct participation group table.

Figure 26:
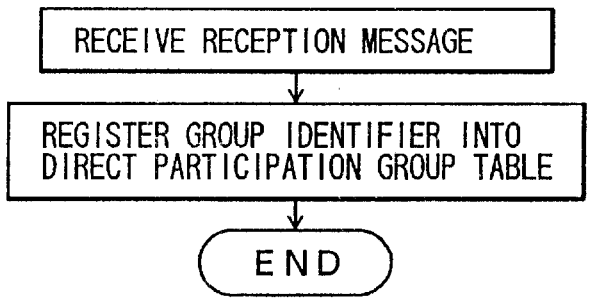
FIG. 26 is a flow chart for describing the operation of the mobile host when it receives a home agent reception message sent from the home agent.
Figure 27:
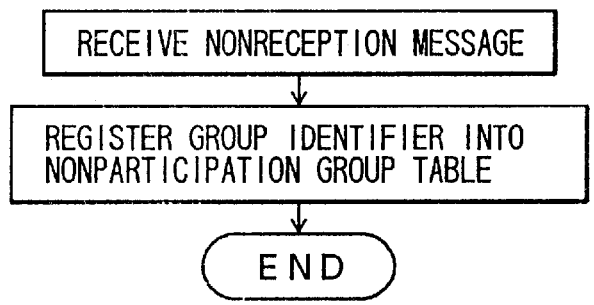
FIG. 27 is a flow chart for describing the operation of the mobile host when it receives a home agent non-reception message sent from the home agent.

When the mobile host receives the home agent reception message, it registers the group identifier of the message into the direct participation group table as shown in FIG. 26. When the mobile host receives the home agent non-reception message, it registers the group identifier included in the message into the nonparticipation group table as shown in FIG. 27.

As described above, the mobile host participates in the multicast group on the basis of the direct participation group table (see FIG. 15), the transfer participation group table (see FIG. 17) and the nonparticipation group table (see FIG. 16). The home agent transfers the multicast packet on the basis of the group characteristic transfer table (see FIG. 11) to support the mobile host. Therefore, the group types of FIG. 2 are achieved.

The multicast group has a continuance time which is decided by the originator. The continuance time is indicated by the group characteristic information as illustrated in FIGS. 8 and 13. The group identifiers are erased from all of the tables included in both of the mobile host and the home agent after the maintaining time passes.

If the mobile host travels from one of sub-network to another sub-network and it gains the new location address, all of the tables used by the mobile host are initialized. When the home agent receives the notice of the travel, it changes the group characteristic transfer table about the mobile host which travels so that the multicast packet is transmitted to the mobile host.

What is claimed is:

1. A method of multicasting a multicast packet from an originator to destinations belonging to a multicast group formed in a network including a plurality of sub-networks which are connected to one another and which include hosts and nodes, said sub-networks accepting a mobile host by a use of said nodes, one of said nodes being related to said mobile host and being called a home agent, any one of said hosts becoming said originator to form said multicast group, said destinations being all of said hosts which belong to said multicast group except said originator, said method comprising the steps of;

selecting at least one of said sub-networks to establish a scope of said multicast group at said originator, multicasting a group characteristic information including a specific group identifier from said originator to said scope before multicasting said multicast packet;

said originator for permitting and denying access to a mobile host located inside the scope of the multicast when the home agent is outside the scope depending upon the construction of the specific group identifier; and said originator for permitting and denying access to a mobile host located outside the scope when the home agent is inside the scope depending upon the construction of the specific group identifier.

2. A method as claimed in claim 1, wherein said method further comprises the steps of;

receiving said group characteristic information at said mobile host, and judging at said mobile host whether or not it is admitted said mobile host to participate in said multicast group on the basis of said group characteristic information.

3. A method as claimed in claim 2, wherein said group characteristic information is directly sent from originator.

4. A method as claimed in claim 3, wherein said group characteristic information includes a member restriction/unrestriction attribute which shows whether or not said originator demands that said home agent is located in said scope.

5. A method as claimed in claim 4, said mobile host having a direct participation group table, wherein said method further comprising the step of registering said specific group identifier into said direct participation group table when said member restriction/unrestriction attribute shows that said originator does not demand that said home agent is located in said scope.

6. A method as claimed in claim 4, wherein said method further comprising the steps of
inquiring of said home agent about whether or not said home agent is located in said scope from said mobile host when said mobile host receives said group characteristic information and said member restriction/unrestriction attribute shows that said originator demands that said home agent is located in said scope, and
replying from said home agent to said mobile host whether or not said home agent is located in said scope.

7. A method as claimed in claim 6, said mobile host having a direct participation group table, wherein said method further comprising the step of registering said specific group identifier into said direct participation group table when said home agent replies to said mobile host that said home agent is located in said scope.

8. A method as claimed in claim 6, said mobile host having a nonparticipation group table, wherein said method further comprising the step of registering said specific group identifier into said nonparticipation group table when said home agent replies to said mobile host that said home agent is not located in said scope.

9. A method as claimed in claim 1, said group characteristic information including a transfer approval/disapproval attribute which shows whether or not it is approved to transfer said group characteristic information to said mobile host located out of said scope by said originator, wherein said method further comprises the step of transferring said group characteristic information as a transferred group characteristic information to said mobile host when said transfer approval/disapproval attribute shows that it is approved to transfer said group characteristic information to said mobile host located out of said scope.

10. A method as claimed in claim 9, said home agent having a group characteristic table, wherein said method further comprising the step of registering said specific group identifier into said group characteristic table when said home agent receives said group characteristic information and said group identifier is not registered in said group characteristic table.

11. A method as claimed in claim 10, wherein said method further comprising the step of inquiring of said mobile host about whether or not said mobile host receives said group characteristic information identified by said specific group identifier when said transfer approval/disapproval attribute shows that it is approved to transfer said group characteristic information to said mobile host located out of said scope before the transferring step.

12. A method as claimed in claim 11, said home agent having a group characteristic transfer table shows whether or not it is necessary to transfer said group characteristic information to said mobile host, wherein said method further comprising the steps of;
registering a transfer unnecessary flag into said group characteristic transfer table when said mobile host replies to said home agent that it is unnecessary to transfer said group characteristic information to said mobile host, and
registering a transfer necessary flag into said group characteristic transfer table when said mobile host replies to said home agent that it is necessary to transfer said group characteristic information to said mobile host.

13. A method as claimed in claim 12, wherein said method comprises the step of referring to said group characteristic transfer table to carry out the transferring step.

14. A method as claimed in claim 13, wherein said method further comprising the step of changing said transfer necessary flag registered in said group characteristic transfer table into said transfer unnecessary flag when said home agent receives a transfer unnecessary message which shows that it is unnecessary to transfer said group characteristic information to said mobile host from said mobile host.

15. A method as claimed in claim 9, wherein said method further comprises the steps of;
receiving said transferred group characteristic information at said mobile host, and
judging whether or not said mobile host participate said multicast group on the basis of said transferred group characteristic information.

16. A method as claimed in claim 15, said mobile host having a transfer participate group table, wherein said method further comprises the steps of;
judging whether or not said mobile host receives said group characteristic information having said specific group identifier from said originator, and
registering said specific group identifier into said transfer participate group table when said mobile host does not receive said group characteristic information from said originator.

17. A method as claimed in claim 16, said mobile host having a nonparticipation group table, wherein said method further comprises the step of erasing said specific group identifier from said nonparticipation group table when said specific group identifier is registered in said nonparticipation group table and said mobile host does not receive said group characteristic information from said originator.

18. A method as claimed in claim 16, said mobile host having a direct participation group table wherein said method further comprising the step of transmitting a transfer unnecessary message to said home agent from said mobile host when said specific group identifier is registered in said direct participation group table.

19. A method as claimed in claim 18, wherein said method further comprising the step of stopping transferring said group characteristic information having said specific group identifier after said home agent receives said transfer unnecessary message.

* * * * *

UNITED STATES PATENT AND TRADEMARK OFFICE
CERTIFICATE OF CORRECTION

PATENT NO. : 6,240,089 B1 Page 1 of 1
DATED : May 29, 2001
INVENTOR(S) : K. Okanoue et al.

It is certified that error appears in the above-identified patent and that said Letters Patent is hereby corrected as shown below:

Title page,
Item [56], References Cited, FOREIGN PATENT DOCUMENTS, delete the second instance of each of the following:
-- 4-157940    5/1992    (JP)
6-337824    12/1994    (JP)
8-163156    6/1996    (JP)
9-214516    8/1997    (JP)
9-326791    12/1997    (JP)
10-13910    1/1998    (JP)
10-135945    5/1998    (JP) --

Item [56], References Cited, OTHER PATENT DOCUMENTS, insert:
-- IEEE Communications magazine, Vol. 35, No. 1
January 1997, Xylomeons, G. et al., "IP Multicast
for Mobile Hosts", pages 54-58.

Derring, Stephen Edward, Multicasting Routing in a Diagram Internetwork,
A Dissertation Submitted to the Dept. of Electrical Engineering and the
Committee on Graduate Studies of Stanford University, December 1991. --

Signed and Sealed this

Twenty-seventh Day of August, 2002

*Attest:*

JAMES E. ROGAN
*Attesting Officer*      *Director of the United States Patent and Trademark Office*